(12) United States Patent
Matsui et al.

(10) Patent No.: US 10,072,576 B2
(45) Date of Patent: Sep. 11, 2018

(54) COOLING SYSTEM FOR GAS TURBINE

(71) Applicant: Mitsubishi Hitachi Power Systems, Ltd., Yokohama, Kanagawa (JP)

(72) Inventors: Tomoyuki Matsui, Yokohama (JP); Hayato Maekawa, Yokohama (JP); Ryo Kawai, Yokohama (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 408 days.

(21) Appl. No.: 14/546,138

(22) Filed: Nov. 18, 2014

(65) Prior Publication Data
US 2015/0135715 A1    May 21, 2015

(30) Foreign Application Priority Data
Nov. 19, 2013  (JP) .................................. 2013-238983

(51) Int. Cl.
*F02C 7/18*  (2006.01)
*F01D 5/08*  (2006.01)
*F01D 5/18*  (2006.01)

(52) U.S. Cl.
CPC ............... *F02C 7/18* (2013.01); *F01D 5/081* (2013.01); *F01D 5/187* (2013.01); *F05D 2220/3212* (2013.01); *F05D 2260/201* (2013.01); *Y02T 50/676* (2013.01)

(58) Field of Classification Search
CPC ...... F02C 7/18; F02C 6/08; F01D 5/08; F01D 5/081; F01D 5/082; F01D 25/12; F01D 5/187; F05B 2260/20; F05D 2220/3212; F05D 2260/201
See application file for complete search history.

(56) References Cited

U.S. PATENT DOCUMENTS

| 4,456,427 A | 6/1984 | Evans et al. |
| 4,818,178 A | 4/1989 | Sibbertsen |
| 5,413,463 A | 5/1995 | Chiu et al. |
| 6,234,746 B1 * | 5/2001 | Schroder .................. F01D 5/08 415/110 |

(Continued)

FOREIGN PATENT DOCUMENTS

| CN | 87 1 01766 A | 10/1987 |
| CN | 1080023 A | 12/1993 |

(Continued)

OTHER PUBLICATIONS

Chinese-language Office Action issued in counterpart Chinese Application No. 201410647462.2 dated Nov. 24, 2015 (sixteen (16) pages).

(Continued)

*Primary Examiner* — Pascal M Bui Pho
*Assistant Examiner* — Katheryn Malatek
(74) *Attorney, Agent, or Firm* — Crowell & Moring LLP (57) ABSTRACT

A gas turbine cooling system efficiently cools a first-stage turbine wheel and attachment portions of first-stage turbine blades. The gas turbine cooling system includes a group of impingement cooling holes provided in a partition wall as a stationary component that separates an exit space of a compressor and a wheel space located upstream of a turbine wheel for ejecting compressed air in the exit space toward the turbine wheel and attachment portions of the turbine blades.

8 Claims, 4 Drawing Sheets

(56) References Cited

U.S. PATENT DOCUMENTS

| | | | |
|---|---|---|---|
| 8,529,195 B2 | 9/2013 | Widener | |
| 9,234,432 B2* | 1/2016 | Shinoda | F01D 9/065 |
| 2007/0003407 A1* | 1/2007 | Turner | F01D 5/082 |
| | | | 415/115 |
| 2009/0155053 A1 | 6/2009 | Speak | |
| 2009/0226327 A1* | 9/2009 | Little | F01D 5/082 |
| | | | 416/96 A |
| 2011/0250057 A1* | 10/2011 | Laurello | F01D 5/081 |
| | | | 415/180 |

FOREIGN PATENT DOCUMENTS

| | | |
|---|---|---|
| JP | 2005-23812 A | 1/2005 |
| JP | 2005-320875 A | 11/2005 |
| JP | 2007-146787 A | 6/2007 |
| JP | 4319087 B2 | 8/2009 |
| JP | 2011-208561 A | 10/2011 |

OTHER PUBLICATIONS

Extended European Search Report dated Mar. 19, 2015 (six (6) pages).

* cited by examiner

COOLING SYSTEM FOR GAS TURBINE

BACKGROUND OF THE INVENTION

1. Field of the Invention

The present invention relates to cooling systems for gas turbines and more particularly to a cooling system for cooling a turbine wheel of a gas turbine and the attachment portions of turbine blades.

2. Description of the Related Art

Main components of a gas turbine include a compressor for compressing air, a combustor for combusting the compressed air with fuel, and a turbine for converting the thermal energy of the resultant combustion gas into rotational energy. Air is suctioned into the compressor where it is compressed, and the compressed air is sent to the combustor where it is combusted with fuel, turning into a high-temperature combustion gas. The combustion gas is then fed to the turbine where it expands. The turbine drives the compressor, and the rest of the output of the turbine is used to drive a load such as a power generator or the like.

The temperature of such combustion gas exceeds 1,000 degrees Celsius; thus, the turbine blades and vanes located at the combustion gas passage and the nearby surfaces of the casing and rotor also have high temperatures. Since the temperatures of the turbine blades and the rotor become high when exposed to high-temperature gas, the turbine wheels to which the turbine blades are attached via their attachment portions also become high in temperature, necessitating cooling of these components. However, the turbine rotor that includes the turbine wheels is a rotary component, which means that difficulties are involved in supplying cooling air to the turbine rotor from its outer circumferential side.

JP-2005-320875-A discloses a method for cooling a turbine wheel of a gas turbine and the attachment portions of turbine blades. In the method, an adjusting unit for adjusting the flow rate or pressure of compressed air is detachably disposed at the entrance of a cooling air passage that directs the compressed air bled from a compressor toward a turbine rotor via the central hole provided in an intermediate shaft that connects a compressor rotor and the turbine rotor. Thus, compressed air with the appropriate flow rate and pressure is directed into the wheel space of the turbine and into the turbine rotor and can be used as sealing air as well as cooling air.

SUMMARY OF THE INVENTION

In the method of the above patent literature, cooling air is fed to the wheel space of the turbine, and by cooling that space, the turbine wheel and the attachment portions of the turbine blades are cooled indirectly. Thus, the heat transfer rate is low, and the turbine wheel and the attachment portions of the turbine blades are not cooled efficiently. This in turn requires a larger amount of compressed air to be bled from the compressor as cooling air, which is one of the factors lowering gas turbine performance.

The present invention has been contrived to solve the above problems, and one of the objects of the invention is to provide a gas turbine cooling system that efficiently cools a first-stage turbine wheel and the attachment portions of first-stage turbine blades.

To solve the above problems, the present invention provides several means for solving the above problems. In one aspect, the invention provides a cooling system for a gas turbine, the gas turbine comprising: a compressor for compressing air; a combustor for combusting the air compressed by the compressor with fuel; and a turbine driven by a combustion gas generated by the combustor, the turbine including at least one turbine wheel having turbine blades on an outer circumferential section thereof, the turbine blades each having an attachment portion to be connected to the turbine wheel, wherein the cooling system comprises at least one group of impingement cooling holes, provided in a partition wall that separates an exit space of the compressor from a wheel space located upstream of the turbine wheel, for ejecting the compressed air in the exit space of the compressor toward the turbine wheel and the attachment portions of the turbine blade.

In accordance with the present invention, part of the compressed air flowing from the compressor is directly ejected onto the first-stage turbine wheel and the attachment portions of the first-stage turbine blades via the group of impingement cooling holes. Thus, the first-stage turbine wheel and the attachment portions of the first-stage turbine blades can be cooled efficiently.

Other problems to be solved by the present invention as well as its structures and advantageous effects will be understood from the following disclosure.

DESCRIPTION OF THE PREFERRED EMBODIMENTS

Gas turbine cooling systems according to embodiments of the present invention will now be described with reference to the accompanying drawings.

Embodiment 1

Figure 1:
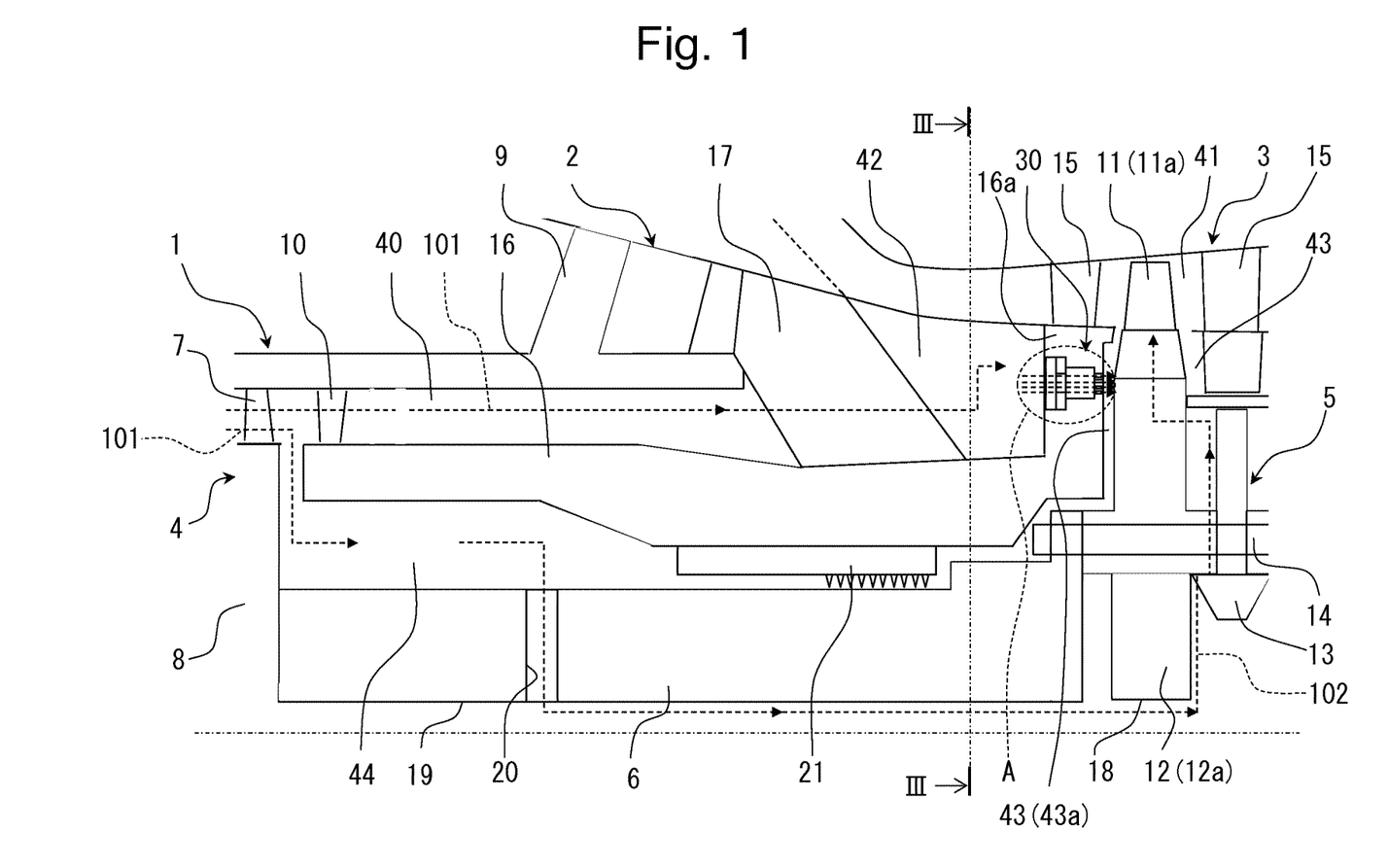
FIG. 1 is a vertical cross section illustrating essential parts of a gas turbine to which a cooling system according to Embodiment 1 of the invention is applied.
Figure 2:
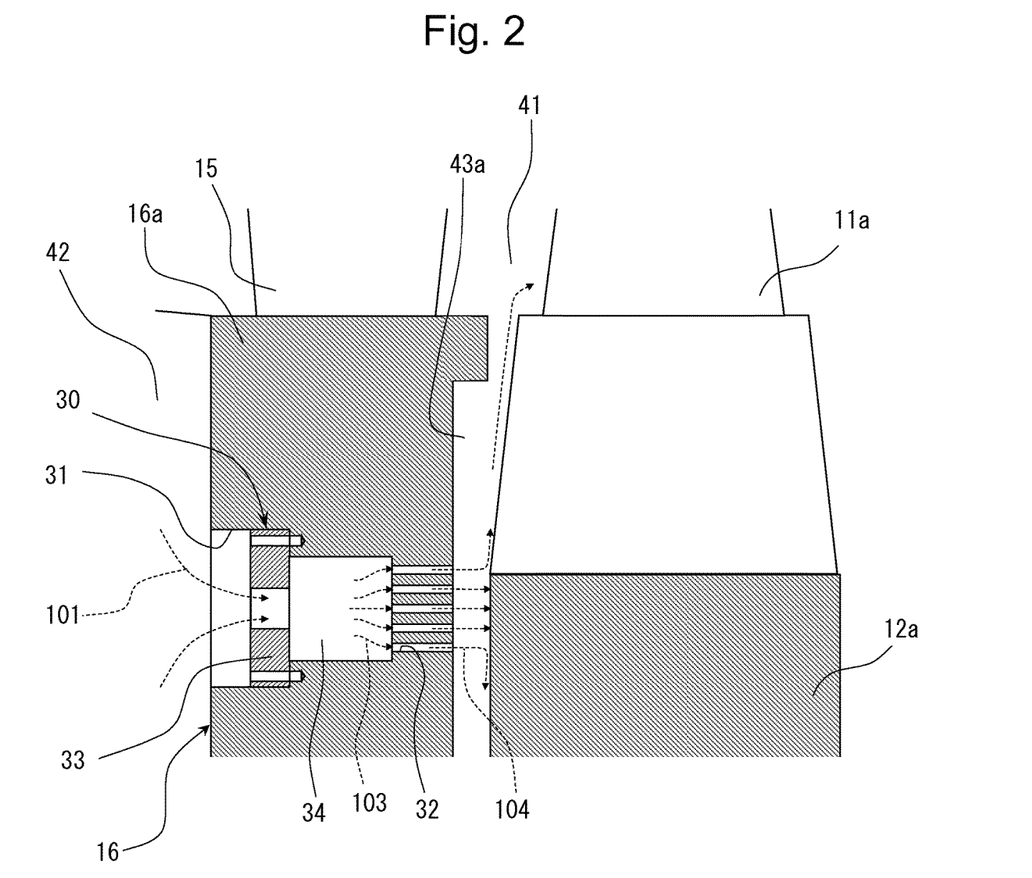
FIG. 2 is an enlarged view of Area A in FIG. 1, illustrating one of the cooling structures constituting the cooling system according to Embodiment 1.
Figure 3:
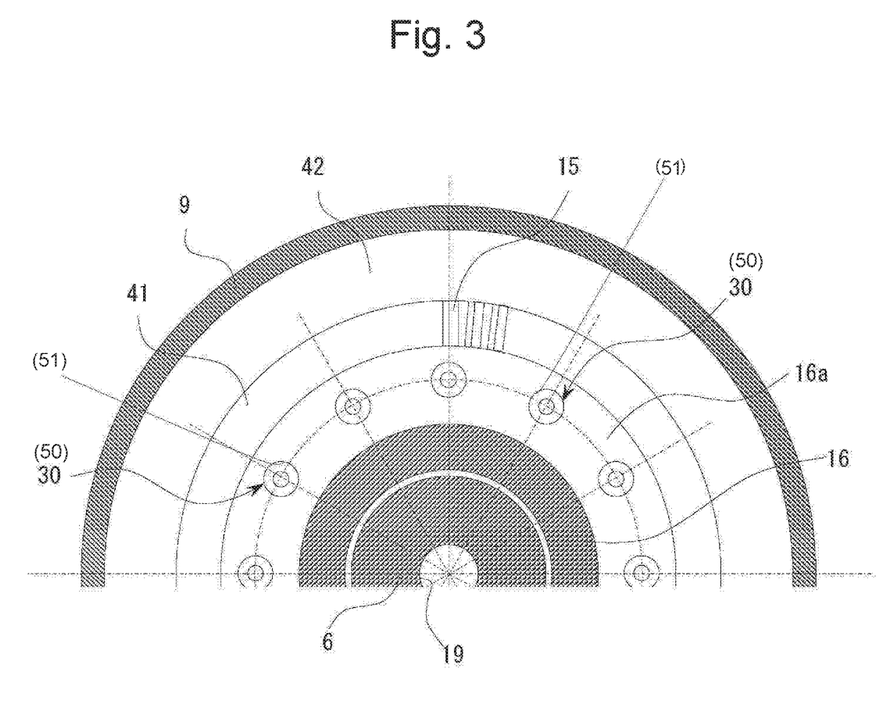
FIG. 3 is a cross section as viewed from the direction of Arrows III in FIG. 1, illustrating essential parts of the gas turbine to which the cooling system according to Embodiment 1 is applied.

FIGS. 1 through 3 illustrate a gas turbine cooling system according to Embodiment 1 of the invention. FIG. 1 is a vertical cross section illustrating essential parts of a gas turbine to which the cooling system according to Embodiment 1 is applied. FIG. 2 is an enlarged view of Area A in FIG. 1, illustrating one of the cooling structures constituting the cooling system according to Embodiment 1. FIG. 3 is a cross section as viewed from the direction of Arrows III in FIG. 1, illustrating essential parts of the gas turbine to which the cooling system according to Embodiment 1 is applied. In FIG. 1, the lower half of the gas turbine is not illustrated, and the dashed arrows represent the flows of compressed air and cooling air.

In the present embodiment, impingement cooling holes are provided in a partition wall located between the exit space of a compressor and the wheel space located upstream of a first-stage turbine wheel so that compressed air in the exit of the compressor jets through the impingement cooling holes toward the first-stage turbine wheel and the attachment portions of first-stage turbine blades. Thus, the first-stage turbine wheel and the attachment portions of the first-stage turbine blades are cooled directly by the compressed air.

With reference to FIG. 1, the gas turbine includes the following components: a compressor 1 for compressing air; a combustor 2 for combusting the air compressed by the compressor 1 with fuel; and a turbine 3 driven by the combustion gas generated by the combustor 2.

The compressor rotor 4 of the compressor 1 and the turbine rotor 5 of the turbine 3 are coaxially connected by an intermediate shaft 6, thereby constituting a gas turbine rotor that rotates as a single unit. This gas turbine rotor is covered with a casing 9.

Though not illustrated completely in FIG. 1, the compressor rotor 4 is formed by stacking in an axial direction multiple compressor wheels 8 each having multiple compressor rotor blades 7 on its outer circumferential section (only the last-stage compressor wheel is shown in FIG. 1). A main compressor passage 40 is formed between the compressor wheels 8 and the casing 9. In the main compressor passage 40, compressor stator vanes 10 fixed to the inner wall of the casing 9 are alternately arranged with the compressor rotor blades 7 in an axial direction.

The turbine rotor 5 is formed by multiple turbine wheels 12 and multiple spacers 13. Each of the turbine wheels 12 has multiple turbine rotor blades 11 on its outer circumferential section. The turbine wheels 12 and spacers 13 are alternately stacked in an axial direction. In FIG. 1, only a first-stage turbine wheel 12a and a first-stage turbine blade 11a are shown. It should be noted, however, that at least one turbine wheel 12 and a spacer 13 are necessary. These turbine wheels 12 and spacers 13 are fastened by stacking bolts 14 to the intermediate shaft 6. As illustrated in FIG. 1, the first-stage turbine wheel 12a has a central hole 18 at its rotational center. Though not illustrated, attachment grooves are formed at particular intervals on the outer circumferential section of each of the turbine wheels 12, and each of the turbine blades 11 has an attachment portion to be connected to a turbine wheel 12. Thus, by engaging the attachment portions of the turbine blades 11 with the attachment grooves on the turbine wheels 12, the turbine blades 11 are fixed to the turbine wheels 12. Located between the turbine wheels 12 and the casing 9 is a passage 41 through which the combustion gas generated by the combustor 2 passes. In the passage 41, turbine stator vanes 15 fixed to the inner wall of the casing 9 are alternately arranged with the turbine blades 11 in an axial direction.

The intermediate shaft 6 has a central hole 19 that extends in an axial direction. This central hole 19 communicates with the central hole 18 of the first-stage turbine wheel 12a. The intermediate shaft 6 is covered with an inner casing 16 with a space provided therebetween. The inner casing 16 includes a partition wall 16a that separates the exit space 42 of the compressor 1 from the wheel space 43a located upstream of the first-stage turbine wheel 12a, and the inner casing 16 is fixed to the casing 9 and other parts via struts 17 and the like. Formed between the intermediate shaft 6 and the inner casing 16 is a cooling air passage 44. The intermediate shaft 6 also has inflow holes 20 that communicate with both of the cooling air passage 44 and the central hole 19 of the intermediate shaft 6. The inflow holes 20 extend in radial directions of the intermediate shaft 6 and are disposed at particular intervals in a circumferential direction of the intermediate shaft 6. As illustrated in FIG. 1, a seal 21 is disposed in an inner circumferential space of the inner casing 16 such that it is located downstream of the inflow holes 20. The seal 21 separates the cooling air passage 44 from the wheel space 43a located upstream of the first-stage turbine wheel 12a, thereby preventing the compressed air flowing inside the cooling air passage 44 from entering the wheel space 43a.

As illustrated in FIG. 1, part of the compressed air 101 flowing inside the main compressor passage 40 flows through the space between the compressor rotor 4 and the inner casing 16 into the inner circumferential space of the inner casing 16. This compressed air 101 then flows through the cooling air passage 44, through the inflow holes 20 and central hole 19 of the intermediate shaft 6, and through the central hole 18 of the first-stage turbine wheel 12a and eventually enters the turbine rotor 5, where the compressed air 101 is used as sealing air and cooling air 102. When the compressed air 101 flows through the cooling air passage 44, the seal 21 prevents the compressed air 101 from flowing into the wheel space 43a located upstream of the first-stage turbine wheel 12a.

Also, impingement cooling structures 30 are formed in the partition wall 16a of the inner casing 16, that is, between the exit space 42 of the compressor 1 and the wheel space 43a. The impingement cooling structures 30 constitute a gas turbine cooling system.

With reference now to FIGS. 2 and 3, the structure of the cooling system according to Embodiment 1 is described in detail. The dashed arrows in FIG. 2 represent the flows of compressed air and cooling air, and in FIG. 3, the lower half of the gas turbine is not shown. Also, in FIG. 3, only several of the stator vanes 15 are illustrated, which are in fact concentrically fixed to the inner wall of the casing 9 at particular intervals. In FIGS. 2 and 3, the same components as used in FIG. 1 are assigned the same reference numerals and will not be discussed further in detail.

As illustrated in FIG. 2, Each of the impingement cooling structures 30 includes a stepped hole 31 on the surface of the partition wall 16a of the inner casing 16 that faces the exit space 42 of the compressor 1 (see also FIG. 1). The stepped hole 31 does not penetrate the partition wall 16a toward the wheel space 43a located upstream of the first-stage turbine wheel 12a and includes a large-diameter section closer to the exit space 42 and a small-diameter section closer to the wheel space 43a.

Each of the impingement cooling structures 30 also includes a group of impingement cooling holes 32 on the bottom surface of the stepped hole 31 (i.e., on a surface of the partition wall 16a). The impingement cooling holes 32 connect the stepped hole 31 and the wheel space 43a. The exits of the impingement cooling holes 32 face a surface of the first-stage turbine wheel 12a and surfaces of the attachment portions of the first-stage turbine blades 11a. The impingement cooling holes 32 are designed to eject the compressed air 101 in the exit space 42 of the compressor 1 toward the surface of the first-stage turbine wheel 12a and the surfaces of the attachment portions of the first-stage turbine blades 11a.

Each of the impingement cooling structures 30 further includes a detachable orifice plate 33 on the bottom surface of the large-diameter section of the stepped hole 31 (i.e., on the side of the partition wall 16a from which compressed air is extracted toward the impingement cooling holes 32). The orifice plate 33 acts as an adjusting unit that adjusts the flow rate or pressure of compressed air (cooling air) 103 flowing into the impingement cooling holes 32 and is fixed with bolts or screws (not illustrated). As the orifice plate 33, other plates having different orifice diameters are also prepared in advance so that the orifice plate 33 can be replaced by one of them. The orifice plate 33 and the small-diameter section of the stepped hole 31 constitute a cooling air header 34 that distributes the compressed air (cooling air) 103 to each of the impingement cooling holes 32.

As illustrated in FIG. 3, the gas turbine cooling system includes the multiple impingement cooling structures 30. The multiple impingement cooling structures 30 are concentrically arranged on the partition wall 16a of the inner casing 16 at particular intervals (in the example of FIG. 3, seven impingement cooling structures 30 are provided for the upper half of the partition wall 16a).

The function of the gas turbine cooling system according to Embodiment 1 are described below with reference to FIGS. 1 through 3.

As illustrated in FIG. 1, the compressed air 101 flows through the main compressor passage 40 and reaches the exit space 42 of the compressor 1, and as illustrated in FIG. 2, part of the air 101 reaching the exit space 42 then flows through the orifice plate 33, where the pressure or flow rate of the air 101 is adjusted. The pressure- or flow-rate-adjusted air is supplied to the cooling air header 34 as cooling air 103. The cooling air 103 supplied to the cooling air header 34 jets from the impingement cooling holes 32 into the wheel space 43a located upstream of the first-stage turbine wheel 12a.

The air ejected from the impingement cooling holes 32 (impingement cooling air 104) collides with an outer surface of the first-stage turbine wheel 12a and with outer surfaces of the attachment portions of the first-stage turbine blades 11a. The resultant impingement jets directly cool the first-stage turbine wheel 12a and the attachment portions of the first-stage turbine blades 11a. At this time, the impingement cooling air 104 also cools the wheel space 43a, reducing the temperature within the wheel space 43a. Thus, the first-stage turbine wheel 12a and the attachment portions of the first-stage turbine blades 11a are also cooled indirectly by the cooling air circulating in the wheel space 43a.

The air that has cooled the first-stage turbine wheel 12a and the attachment portions of the first-stage turbine blades 11a then flows through the space between the attachment portions of the first-stage turbine blades 11a and the inner casing 16 into the passage 41, where the air joins the combustion gas flowing through the passage 41.

As above, in the present embodiment, the exits of the impingement cooling holes 32 of the impingement cooling structures 30 are provided on the surface of the partition wall 16a of the inner casing 16 that faces the first-stage turbine wheel 12a and the first-stage turbine blades 11a, so that the impingement cooling air 104 is ejected directly to the first-stage turbine wheel 12a and the attachment portions of the first-stage turbine blades 11a. Thus, the first-stage turbine wheel 12a and the attachment portions of the first-stage turbine blades 11a are cooled directly by the impingement cooling air 104. This method achieves a higher heat transfer rate and reduces metal temperature more efficiently than a conventional method in which metal temperature is reduced by cooling the wheel space upstream of the first-stage turbine wheel using the compressed air bled from the compressor and by indirectly cooling the first-stage turbine wheel and the attachment portions of the first-stage turbine blades. Accordingly, the amount of compressed air to be bled from the compressor 1 as cooling air can be reduced, which in turn increases the efficiency and output of the gas turbine.

Also, in the present embodiment, since the multiple impingement cooling structures 30 are arranged in a circumferential direction of the partition wall 16a, the first-stage turbine wheel 12a and the attachment portions of the first-stage turbine blades 11a can be cooled uniformly. Further, the concentric arrangement of the impingement cooling structures 30 at particular intervals allows more uniform and efficient cooling.

In a conventional method in which the first-stage turbine wheel and the attachment portions of the first-stage turbine blades are indirectly cooled by cooling the wheel space upstream of the first-stage turbine wheel using the compressed air bled from the compressor, the temperature of the wheel space tends to vary depending on radial or circumferential positions, which requires adjustment of the flow rate of cooling air using a higher-temperature spot as a reference point.

In the present embodiment, by contrast, orifice plates having different orifice diameters are prepared in advance as the orifice plates 33 of the impingement cooling structures 30. Thus, if the flow rate or pressure of cooling air becomes too large or too small due to turbine use conditions, or if temperature deviations occur in circumferential directions of the first-stage turbine wheel 12a and the attachment portions of the first-stage turbine blades 11a, the orifice plate 33 of each of the impingement cooling structures 30 can be replaced by one with the appropriate orifice diameter. The replacement can be done by removing the combustor 2 even after the installation of the gas turbine. By such replacement, the flow rate or pressure of the cooling air 103 entering the cooling air header 34 of each of the impingement cooling structures 30 can be adjusted independently and with ease, whereby the first-stage turbine wheel 12a and the attachment portions of the first-stage turbine blades 11a can be cooled more uniformly. As a result, the flow rate of cooling air does not need to be adjusted based on a higher-temperature reference spot, and the amount of compressed air to be bled from the compressor 1 as cooling air can be further reduced, leading to increased efficiency and output of the gas turbine.

Further, if the combustion temperature or turbine blades need to be changed for better turbine performance, adjustment of the flow rate or pressure of the impingement cooling air 104 can be done by replacing the orifice plates 33 by one with the appropriate orifice diameter. Therefore, the adjustment can be easily done without disassembly, refabrication, and reassembly of the inner casing 16 and the intermediate shaft 6. In other words, disassembly and assembly during replacement of the orifice plates 33 requires less effort, time, and cost.

Moreover, since the seal 21 is disposed within the inner casing 16 such that it is located downstream of the inflow holes 20, the compressed air 102 (cooling air) flowing in the cooling air passage 44 is prevented from entering the wheel space 43a located upstream of the first-stage turbine wheel 12a. Thus, the flow of the impingement cooling air 104 ejected from the impingement cooling holes 32 is not disturbed by the compressed air 102 from the cooling air passage 44, and the impingement cooling air 104 can reliably be ejected onto the first-stage turbine wheel 12a and the attachment portions of the first-stage turbine blades 11a.

As described above, in the gas turbine cooling system according to Embodiment 1, part of the compressed air flowing from the compressor 1 is directly ejected onto the first-stage turbine wheel 12a and the attachment portions of the first-stage turbine blades 11a via the group of impingement cooling holes 32. Therefore, the first-stage turbine wheel 12a and the attachment portions of the first-stage turbine blades 11a can be cooled efficiently.

Embodiment 2

Figure 4:
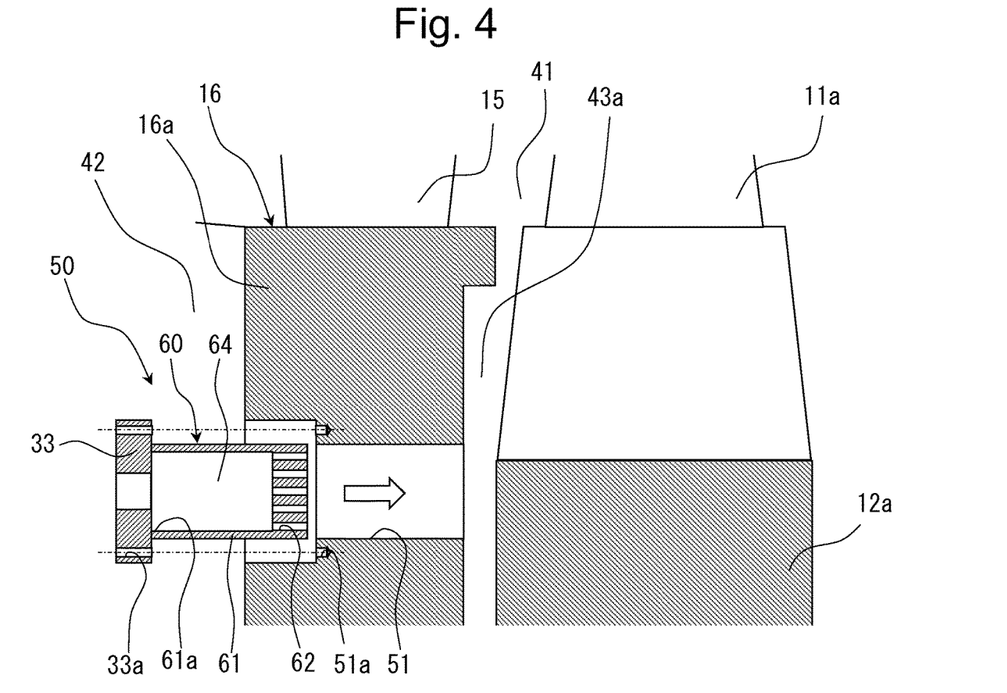
FIG. 4 is a cross section illustrating one of the cooling structures constituting a cooling system according to Embodiment 2 of the invention.
Figure 5:
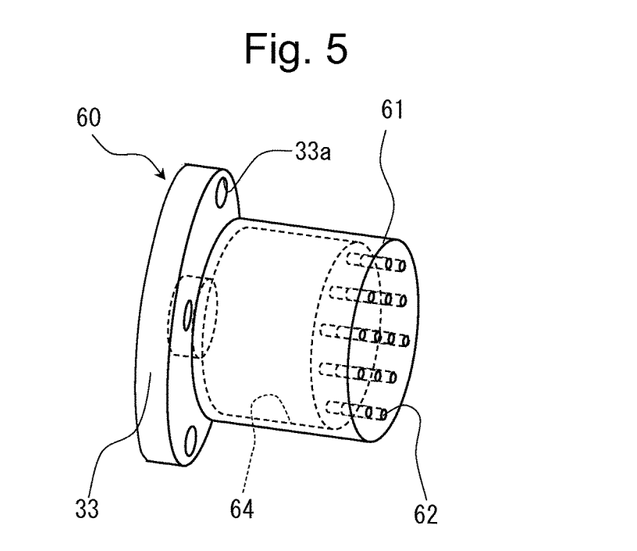
FIG. 5 is a perspective view of the cartridge constituting the cooling structure illustrated in FIG. 4.

With reference to FIGS. 4 and 5, a gas turbine cooling system according to Embodiment 2 of the invention is described below.

FIGS. 4 and 5 illustrate one of the cooling structures constituting the cooling system according to Embodiment 2. FIG. 4 is a cross section illustrating the cooling structure while FIG. 5 is a perspective view of the cartridge constituting the cooling structure illustrated in FIG. 4. In FIG. 4, the cartridge, designated by 60, is shown detached from the inner casing 16, and the arrow of FIG. 4 represents the direction of installing the cartridge 60 into the inner casing 16. In FIGS. 4 and 5, the same components as used in FIGS. 1 through 3 are assigned the same reference numerals and will not be discussed further in detail.

While Embodiment 1 is designed such that the group of impingement cooling holes 32 are formed in the partition wall 16a of the inner casing 16, Embodiment 2 is designed such that each cartridge 60 having a group of impingement cooling holes 62 is attached to the partition wall 16a and can be detached if necessary.

Specifically, as illustrated by the impingement cooling structure 50 of FIG. 4, a stepped installation hole 51 is formed in the partition wall 16a of the inner casing 16. The stepped installation hole 51 connects the exit space 42 of the compressor 1 (see FIG. 1) and the wheel space 43a located upstream of the first-stage turbine wheel 12a. The stepped installation hole 51 includes a large-diameter section closer to the exit space 42 and a small-diameter section closer to the wheel space 43a. The opening of the installation hole 51 on the side of the wheel space 43a is provided at the place of the partition wall 16a that faces the first-stage turbine wheel 12a and the attachment portions of the first-stage turbine blades 11a. Similar to the cooling structures 30 of FIG. 3, multiple installation holes 51 are concentrically arranged on the partition wall 16a at particular intervals.

A cartridge 60 is installed into each of the stepped installation holes 51 of the inner casing 16 and is used to directly eject the compressed air in the exit space 42 toward the first-stage turbine wheel 12a and the attachment portions of the first-stage turbine blades 11a. As illustrated in FIGS. 4 and 5, each of the cartridges 60 includes a cartridge body 61 shaped like a cylinder with a bottom surface and an orifice plate 33. The cartridge body 61 has an opening 61a on one side, into which the compressed air in the exist space 42 flows, and impingement cooling holes 62 on the opposite-side bottom surface. The orifice plate 33 is attached to the opening 61a of the cartridge body 61 and acts as an adjusting unit that adjusts the flow rate or pressure of compressed air (cooling air) flowing into the impingement cooling holes 62 of the cartridge 60. The cartridge body 61 and the orifice plate 33 constitute a cooling air header 64. Each of the cartridges 60 can independently be attached to and detached from each of the installation holes 51. Also, as the cartridges 60, different types of cartridges are prepared beforehand in which the orifice plates 33 differ in orifice diameter and the groups of impingement cooling holes 62 differ in diameter, position, or number. Each of the cartridges 60 is fixed such that its orifice plate 33 faces the exit space 42 while the bottom surface of its cartridge body 61 on which the impingement cooling holes 62 are formed faces the wheel space 43a. Each of the cartridges 60 can be fixed, for example, by forming bolt holes 33a in its orifice plate 33 and screw holes 51a on the bottom surface of the large-diameter section of its associated installation hole 51 and then screwing bolts, screws, or the like (not illustrated).

As above, in the gas turbine cooling system according to Embodiment 2, each of the cartridges 60 having the group of impingement cooling holes 62 is installed into each of the installation holes 51 provided at the place of the partition wall 16a of the inner casing 16 that face the first-stage turbine wheel 12a and the attachment portions of the first-stage turbine blades 11a. Accordingly, the same advantageous effects as those of Embodiment 1 can be obtained.

Also, since the group of impingement cooling holes 62 are formed at the bottom section of the cartridge body 61 of the cartridge 60, not in the partition wall 16a of the inner casing 16, the time, effort, and cost involved in fabrication of the inner casing 16 can be reduced.

Further, in Embodiment 2, each of the cartridges 60 can independently be attached to and detached from each of the installation holes 51 of the inner casing 16. Thus, any of the installed cartridges 60 can be replaced by different cartridges in which the orifice plates 33 differ in orifice diameter and the group of impingement cooling holes 62 differ in diameter, position, or number. Such replacement can be done as desired, depending on the operating conditions of the gas turbine, on the metal temperatures of the first-stage turbine wheel 12a and the attachment portions of the first-stage turbine blades 11a, or on the ambient temperature of the wheel space 43a located upstream of the first-stage turbine wheel 12a. In other words, each of the installed cartridges 60 can independently be replaced by the appropriate one depending on various conditions and states of the gas turbine. This allows not only finer adjustment of the flow rate or pressure of the impingement cooling air 104 than in Embodiment 1 but also adjustment of the cooling areas in which impingement cooling is performed. Thus, the first-stage turbine wheel 12a and the attachment portions of the first-stage turbine blades 11a can be cooled much more uniformly. As a result, the amount of compressed air to be bled from the compressor 1 as cooling air can be further reduced, which in turn further increases the efficiency and output of the gas turbine.

Moreover, in Embodiment 2, the flow rate or pressure of the impingement cooling air 104 can be adjusted with ease by simply removing the combustor 2 and replacing the cartridges 60 with the appropriate ones. Also, when the flow rate or pressure of the impingement cooling air 104 or the cooling areas need to be adjusted by changing the positions, number and diameter of the groups of impingement cooling holes 62, it is only necessary to replace the cartridges 60. Thus, such adjustment can be done much more easily than in Embodiment 1 in which the inner casing 16 needs to be refabricated to adjust the impingement cooling holes 32.

Other Embodiments

The foregoing embodiments illustrate examples where cooling structures having impingement cooling holes are provided in the inner casing 16. However, one of the essential effects achieved by the invention is the efficient cooling in which the impingement cooling holes are provided in a partition located between the exit space 42 of the compressor 1 and the wheel space 43a located upstream of the first-stage turbine wheel 12a, thereby directly ejecting compressed air toward the first-stage turbine wheel 12a and the attachment portions of the first-stage turbine blades 11a. Thus, the cooling structures do not necessarily need to be provided in the inner casing 16. When, for example, the support ring for the first-stage stator vanes is positioned between the exit space 42 and the wheel space 43a, the cooling structures can instead be provided on that support ring.

Also, the foregoing embodiments illustrate examples where the orifice plates 33 are used to adjust the flow rate or pressure of the compressed air 103 (cooling air) entering the groups of impingement cooling holes 32 and 62. However, one of the essential effects achieved by the invention is the adjustment of the flow rate or pressure of cooling air to be ejected toward the first-stage turbine wheel 12a and the attachment portions of the first-stage turbine blades 11a. Thus, as long as the above effect is achieved, the invention is not necessarily limited to the orifice plates 33.

The foregoing embodiments further illustrate examples where multiple cooling structures having impingement cooling holes are concentrically arranged on the partition wall 16a. However, one of the essential effects achieved by the invention is the uniform cooling in which multiple groups of impingement cooling holes are provided in a partition that separates the exit space 42 from the wheel space 43a, thereby uniformly cooling the first-stage turbine wheel 12a and the attachment portions of the first-stage turbine blades 11a. Thus, as long as the above effect is achieved, the invention is not limited to the concentric arrangement.

Further, while the foregoing embodiments illustrate examples where cooling structures include the orifice plates 33, one of the essential effects achieved by the invention is the efficient cooling in which cooling air is directly ejected toward the first-stage turbine wheel 12a and the attachment portions of the first-stage turbine blades 11a via impingement cooling holes. Thus, the orifice plates 33 are not necessarily needed. For instance, by appropriately selecting the positions, number, and diameter of the groups of impingement cooling holes 62, the flow rate or pressure of cooling air to be ejected toward the first-stage turbine wheel 12a and the attachment portions of the first-stage turbine blades 11a or the cooling areas can be adjusted well to achieve efficient cooling.

Also, Embodiment 1 illustrates an example where the orifice plates 33 are fastened to the bottom surfaces of the large-diameter sections of the stepped holes 31 on the inner casing 16 with fasters such as bolts, screws, or the like. However, threads can instead be cut in the side surfaces of the orifice plates 33 and in the side surfaces of the large-diameter sections of the stepped holes 31 so that the orifice plates 33 can be screwed into the large-diameter sections.

Moreover, while Embodiment 2 illustrates an example where the cartridges 60 are fastened to the installation holes 51 of the inner casing 16 with fasters such as bolts, screws, or the like, threads can instead be cut in the outer surfaces of the cartridges 60 and in the side surfaces of the installation holes 51 so that the cartridges 60 can be screwed into the installation holes 51.

Furthermore, Embodiment 2 illustrates an example where each of the cartridges 60 includes a cartridge body 61 shaped like a cylinder with a bottom surface and an orifice plate 33 attached to the cartridge body 61. However, each of the cartridges 60 can instead be composed of only a cartridge body 61 without an orifice plate 33. In this case, an orifice plate 33 is attached on the side of an installation hole 51 from which compressed air is extracted, and a cartridge 60 is installed into the installation hole 51 such that the cartridge 60 is located downstream of the orifice plate 33. In this case as well, the same advantageous effects as those of Embodiment 2 can be achieved. In addition, the flow rate or pressure of the impingement cooling air 104 can be adjusted more finely because the orifice plates and the cartridges can be replaced independently depending on various conditions and states of the gas turbine.

Also, the foregoing embodiments illustrate examples where the cooling systems each include multiple impingement cooling structures. However, one of the essential effects achieved by the invention is the efficient cooling. It should be noted that at least one impingement cooling structure is necessary in order to efficiently cool the first-stage turbine wheel 12a and the attachment portions of the first-stage turbine blades 11a.

The invention is not limited to the above embodiments disclosed, but allows various modifications. The foregoing embodiments are only meant to be illustrative, and the invention is not necessarily limited to structures having all the components disclosed. For instance, part of the components of one embodiment can be replaced by part of the components of another, or part of the components of one embodiment can be added to the components of another. Further, each of the foregoing embodiments allows addition, removal, and replacement of certain components.

What is claimed is:

1. A cooling system for a gas turbine, the gas turbine comprising:
    a compressor for compressing air;
    a combustor for combusting the air compressed by the compressor with fuel; and
    a turbine driven by a combustion gas generated by the combustor, the turbine including at least one turbine wheel having turbine blades on an outer circumferential section thereof, the turbine blades of the at least one turbine wheel each having an attachment portion to be connected to the at least one turbine wheel,
    the cooling system comprising at least one group of impingement cooling holes provided in a local portion of a partition wall as a stationary component that separates an exit space of the compressor from a wheel space located upstream of the at least one turbine wheel for allowing the compressed air in the exit space of the compressor to impinge on the at least one turbine wheel and the respective attachment portions of the turbine blades of the at least one turbine wheel, and
    an orifice plate configured to be inserted and removably detached by fasteners on an upstream side of the stationary component and insertable into a hole in the stationary component to introduce impingement cooling air on the at least one turbine wheel downstream of the stationary component.

2. The cooling system of claim 1, wherein the at least one group of impingement cooling holes comprise a plurality of groups of impingement cooling holes, the plurality of groups of impingement cooling holes being arranged in a circumferential direction of the partition wall.

3. The cooling system of claim 1, wherein the cooling system further comprises at least one adjusting unit, disposed detachably on an upstream side of the group of impingement cooling holes in the partition wall, for adjusting a flow rate or a pressure of the compressed air flowing into the at least one group of impingement cooling holes.

4. A cooling system for a gas turbine, the gas turbine comprising:
    a compressor for compressing air;
    a combustor for combusting the air compressed by the compressor with fuel; and
    a turbine driven by a combustion gas generated by the combustor, the turbine including at least one turbine wheel having turbine blades on an outer circumferential section thereof, the turbine blades of the at least one turbine wheel each having an attachment portion to be connected to the at least one turbine wheel,
    the cooling system further comprising:
    at least one installation hole formed in a partition wall as a stationary component that separates an exit space of the compressor from a wheel space located upstream of the at least one turbine wheel such that the at least one installation hole connects the exit space and the wheel space; and at least one cartridge detachably installed into the at least one installation hole, the at least one cartridge having a group of impingement cooling holes for allowing the compressed air in the exit space of the compressor to impinge on the at least one turbine wheel and the respective attachment portions of the turbine blades of the at least one turbine wheel;

the at least one cartridge configured to be inserted and removably detached by fasteners on an upstream side of the stationary component and insertable to introduce impingement cooling air on the at least one turbine wheel downstream of the stationary component.

5. The cooling system of claim 4, wherein the at least one installation hole comprises a plurality of installation holes, the at least one cartridge comprises a plurality of cartridges, the plurality of installation holes and the plurality of cartridges being arranged in a circumferential direction of the partition wall.

6. The cooling system of claim 5, wherein each of the plurality of cartridges can independently be attached into and detached from each of the plurality of installation holes.

7. The cooling system of claim 4, wherein the at least one cartridge includes:

a body having an opening into which the compressed air in the exit space of the compressor flows and the group of impingement cooling holes; and an adjusting unit, attached to the opening, for adjusting a flow rate or a pressure of the compressed air flowing into the group of impingement cooling holes.

8. The cooling system of claim 4, wherein the cooling system further comprises at least one adjusting unit disposed on a compressed-air-intake side of the at least one installation hole for adjusting a flow rate or a pressure of the compressed air flowing into the group of impingement cooling holes.

* * * * *